United States Patent
Dust et al.

(10) Patent No.: US 10,604,870 B2
(45) Date of Patent: Mar. 31, 2020

(54) INCREASING THE FILAMENT COUNT OF CARBON FIBER TOWS

(71) Applicant: Hexcel Corporation, Dublin, CA (US)

(72) Inventors: Adam Dust, Salt Lake City, UT (US); Robert Loesch, Midvale, UT (US); Harini Dasarathy, Huntsville, AL (US); Rebecca Forsgren, West Valley City, UT (US)

(73) Assignee: HEXCEL CORPORATION, Dublin, CA (US)

( * ) Notice: Subject to any disclaimer, the term of this patent is extended or adjusted under 35 U.S.C. 154(b) by 121 days.

(21) Appl. No.: 15/994,849

(22) Filed: May 31, 2018

(65) Prior Publication Data
US 2019/0368080 A1    Dec. 5, 2019

(51) Int. Cl.
*D02J 1/18* (2006.01)
*D01F 8/18* (2006.01)
*D02J 1/08* (2006.01)

(52) U.S. Cl.
CPC ............... *D02J 1/18* (2013.01); *D01F 8/18* (2013.01); *D02J 1/08* (2013.01); *D10B 2101/12* (2013.01)

(58) Field of Classification Search
CPC ... B65H 69/061; B65H 2701/314; D02J 1/08; D02J 1/18
See application file for complete search history.

(56) References Cited

U.S. PATENT DOCUMENTS

| | | | |
|---|---|---|---|
| 3,339,362 A * | 9/1967 | Dodson, Jr. | B65H 69/061 57/22 |
| 3,704,485 A | 12/1972 | Hall | |
| 3,795,944 A * | 3/1974 | Daniels | D01D 10/0481 28/283 |
| 3,873,389 A | 3/1975 | Daniels | |
| 4,874,563 A | 10/1989 | McMahon et al. | |
| 5,094,883 A | 3/1992 | Muzzy et al. | |
| 5,182,839 A | 2/1993 | Stuart | |

(Continued)

FOREIGN PATENT DOCUMENTS

| | | |
|---|---|---|
| CN | 101858037 A | 10/2010 |
| CN | 104862796 A | 5/2015 |

(Continued)

OTHER PUBLICATIONS

CN101858037A—machine English translation.
(Continued)

*Primary Examiner* — Shaun R Hurley
(74) *Attorney, Agent, or Firm* — W. Mark Bielawski; David J. Oldenkamp

(57) ABSTRACT

The filament count of a carbon fiber tow is increased by spreading and commingling the carbon filaments of a first tow with the carbon filaments of a second tow. The carbon filaments of the first and second tows are spread apart using a gas stream. The spread tows are aligned with each other and brought into contact as they pass over a grating in the presence of the same or a different gas stream to form an entangled tow. The entangled tow is then formed into a combined tow. The modulus and denier of the carbon filaments in the first and second tows may be the same or they can be varied to provide combined tows with a wide range of filament counts and filament combinations.

14 Claims, 3 Drawing Sheets

(56) References Cited

U.S. PATENT DOCUMENTS

| | | | |
|---|---|---|---|
| 5,334,414 A | 8/1994 | Edie et al. | |
| 5,355,567 A * | 10/1994 | Holliday | B29C 70/16 |
| | | | 156/148 |
| 5,584,943 A | 12/1996 | Banaszak et al. | |
| 6,245,423 B1 * | 6/2001 | Ikeda | D01F 6/18 |
| | | | 264/206 |
| 6,485,592 B1 * | 11/2002 | Yoshimura | B65H 69/061 |
| | | | 156/148 |
| 7,155,890 B2 * | 1/2007 | Kawamura | B65H 69/061 |
| | | | 57/22 |
| 7,596,834 B2 | 10/2009 | Shinkado | |
| 7,941,903 B2 | 5/2011 | Ikeda et al. | |
| 9,884,740 B2 * | 2/2018 | Mishima | D02J 1/08 |
| 2002/0157765 A1 * | 10/2002 | Takeuchi | B29C 70/20 |
| | | | 156/157 |
| 2003/0172506 A1 * | 9/2003 | Guirman | D02J 1/18 |
| | | | 28/282 |
| 2012/0321888 A1 * | 12/2012 | Rumy | B65H 69/065 |
| | | | 428/367 |
| 2015/0354110 A1 * | 12/2015 | Linck | D04H 1/4242 |
| | | | 28/104 |
| 2017/0305077 A1 * | 10/2017 | Nakai | B29C 66/832 |
| 2018/0043580 A1 * | 2/2018 | Prins | D02J 1/18 |
| 2018/0313027 A1 * | 11/2018 | Horimoto | D02J 1/18 |

FOREIGN PATENT DOCUMENTS

| | | |
|---|---|---|
| CN | 106629254 A | 5/2017 |
| EP | 3176295 A1 | 6/2017 |
| WO | 2017153763 A1 | 9/2017 |
| WO | 2018038033 A1 | 3/2018 |

OTHER PUBLICATIONS

CN104862796A—machine English translation.
International Search Report and Written Opinion for the related International Application No. PCT/US2019/031862, dated Jul. 11, 2019.

* cited by examiner

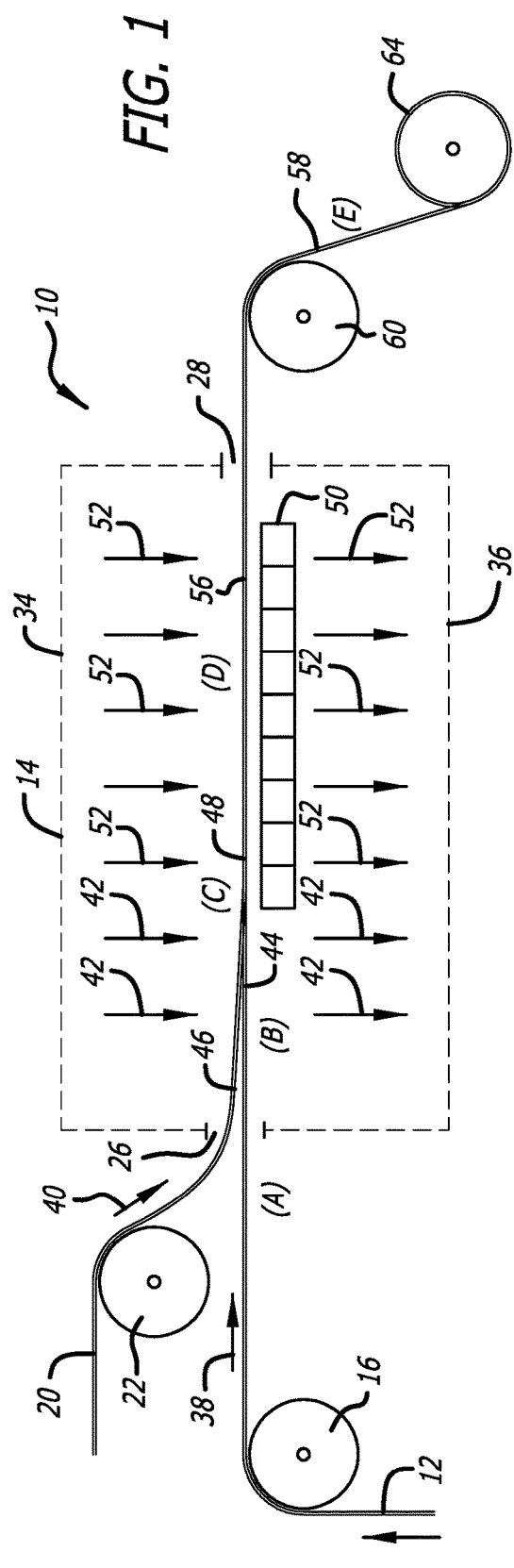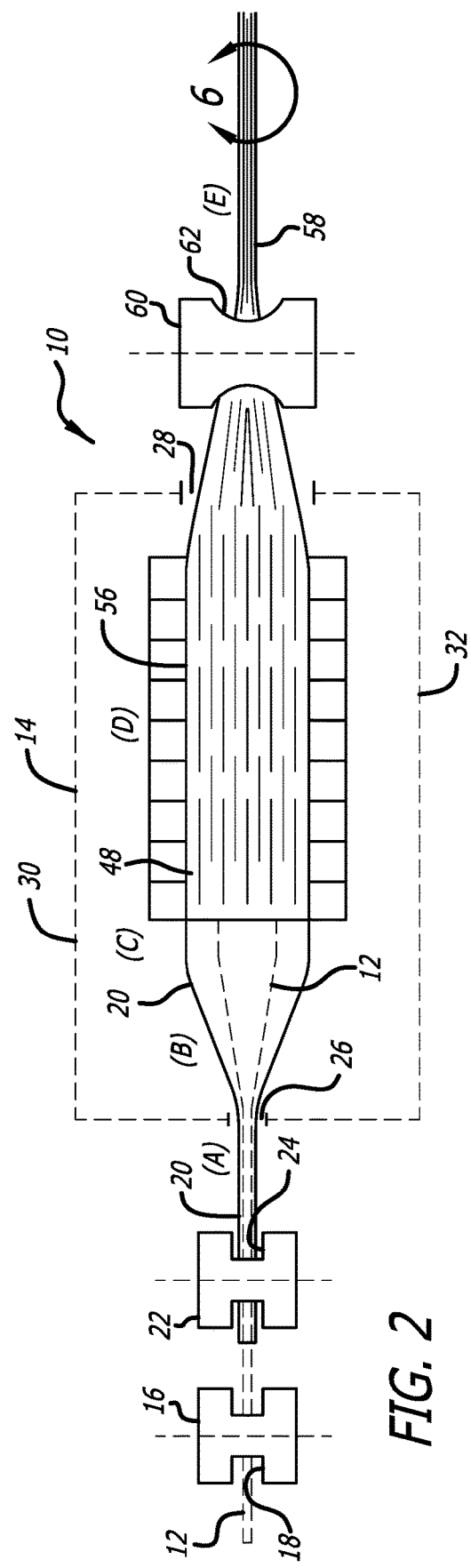

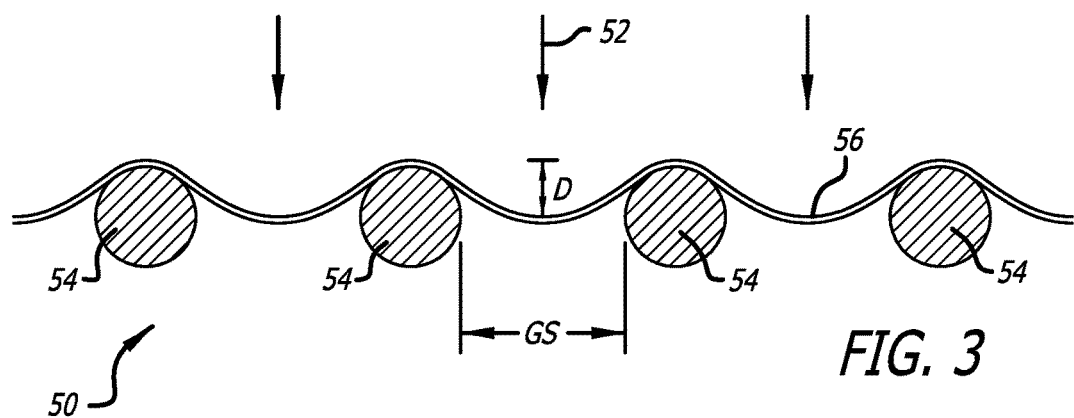
FIG. 3
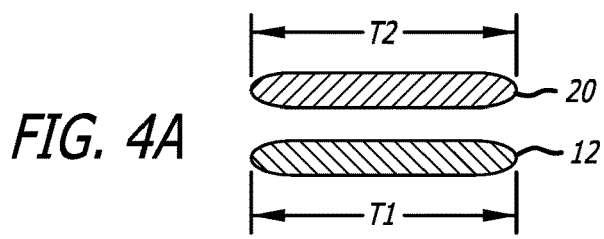
FIG. 4A
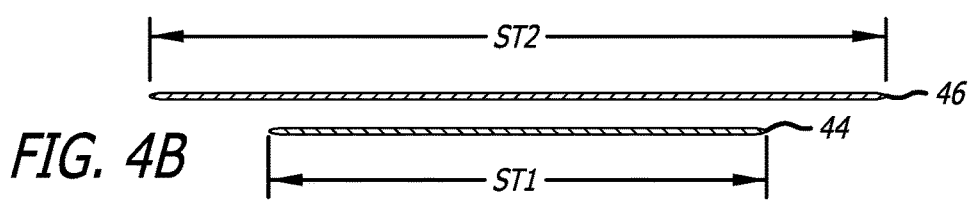
FIG. 4B
FIG. 4C
FIG. 4D
FIG. 4E
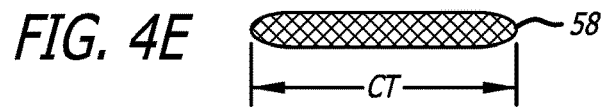

INCREASING THE FILAMENT COUNT OF CARBON FIBER TOWS

BACKGROUND OF THE INVENTION

1. Field of the Invention

The present invention relates generally to carbon fiber tows that are composed of carbon filaments. More particularly, the present invention is directed to methods for increasing the filament count of any given carbon fiber tow by physically incorporating one or more other carbon fiber tows directly into the tow.

2. Description of Related Art

Composite materials include a fibrous reinforcement structure and a resin matrix as the two principal components. Composite materials typically have a rather high strength to weight ratio. As a result, composite materials are used in the aerospace industry where the high strength and relatively light weight of composite structures are of particular importance.

Carbon fibers are a popular fibrous reinforcement for composite materials. Carbon fibers are typically provided as a multifilamentary yarn that is commonly referred to as a "tow". Carbon fiber tows typically contain from 1,000 to 50,000 individual filaments. Commercially available carbon fiber tows contain, for example, approximately 3000 filaments (3K), 6000 filaments (6K), 12000 (12K) filaments or 24000 (24K) filaments. The linear weight of a single carbon filament is typically in the range of from 0.02 to 0.5 milligrams per meter.

The linear weight of a carbon fiber tow depends upon the number of filaments, their linear weight and the weight of any coatings or other tow treatments. HexTow® AS4 is a type of carbon fiber tow that is available form Hexcel Corporation (Dublin, Calif.). The 3K version of HexTow® AS4 carbon fiber tow has a linear weight of approximately 0.21 grams per meter with the 6K and 12 K versions having linear weights, respectively, of approximately 0.43 grams per meter and approximately 0.86 grams per meter. HexTow® IM7 is another type of carbon fiber tow that is also available from Hexcel Corporation (Dublin, Calif.). HexTow® IM7 carbon fiber tows have a higher tensile strength and tensile modulus than HexTow® AS4 carbon fiber tows. The linear weight of a 6K HexTow® IM7 carbon fiber tow is approximately 0.22 grams per meter with the 12K version having a linear weight of approximately 0.45 grams per meter.

The filaments in carbon fiber tows are not twisted in the same manner as conventional yarns. Instead, the filaments in a carbon fiber tow are substantially parallel to each other. As a result, carbon fiber tows tend to have a flat tape-like cross-sectional shape. The carbon filaments are entangled with each other to provide some cohesiveness to the tow so that is can be handled and processed to some degree without falling apart. The cohesiveness of a carbon fiber tow is commonly measured by determining the "spreadability" of the tow. Tow evaluation testing machines are available commercially for use in determining a number of carbon fiber tow properties, including spreadability. For example, a tow evaluation testing machine is available from Textechno H. Stein GmbH & Co. KG (Moenchengladbach, Germany) under the tradename ROVINGTEST. Tow evaluation test Brach ices or equipment are common in the textile industry.

Spreadability is determined in a typical tow evaluation test machine by placing the tow under a pre-determined tension and passing it over a series of spreader bars. The width of the tow is measured before the spreader bars (W1) and immediately after the spreader bars (W2). The spreadability of the tow is equal to W2/W1. Spreadability values (W2/W1) on the order of 1.2 to 2.2 are typical for carbon fiber tows depending upon the filament count, filament linear weight, type of filament, degree of filament entanglement and post-formation treatments, such as the application of a sizing or other coating.

Carbon filaments are relatively fragile. Accordingly, carbon filaments are susceptible to damage during the production of carbon fiber tows and subsequent handling. Tow fuzz or fuzziness refers to broken filaments and fluff that may be present on the surface of a carbon fiber tow. Test equipment for measuring the amount of fuzz present on the surface of a carbon fiber tow are commercially available. The amount of fuzz is expressed as a fuzz count or fuzz value. An exemplary testing device for measuring the fuzz count of a carbon fiber tow is the FRAY VIEW yarn defects visualization device that is available from Lenzing Instruments GmbH & Co. KG (Gampem, Austria). The FRAY VIEW device measures fuzz count using an optical sensor and high resolution digital camera.

The fuzz count of a carbon fiber tow will vary depending many factors including how the tow was processed and handled, filament count, filament linear weight, type of filament and post-formation treatments, such as the application of a sizing or other coating. In general, it is desirable that the carbon fiber tow have a fuzz count that is as low as possible. However, there are situations, where some degree of filament breakage is desired. For example, breaking filaments in carbon fiber tows has been used to increase Z-direction electrical conductance in carbon fiber composite laminates. In these situations, fuzz count is measured and monitored to ensure that the carbon fiber tow has the desired level of filament breakage.

SUMMARY OF THE INVENTION

In accordance with the present invention, the filament count of a first carbon fiber tow is increased by physically combining a second carbon fiber tow with the first carbon fiber tow to form a combined tow. It was discovered that the two carbon fiber tows could be physically combined to provide a cohesive combined tow that exhibits a spreadability which is close to the spreadability of the first and second tows. It was further discovered that such a combined tow could be formed without unduly increasing the amount of damaged filaments present in the first or second tow.

The present invention is based on a method for increasing the filament count of a carbon fiber to form a combined tow where a first tow composed of first carbon filaments and having a first tow width is passed into a spreading/commingling zone where it is subjected to a first gas stream to four a spread first tow. A second tow composed of second carbon filaments and having a second tow width is also passed into the spreading/commingling zone where it is subjected to the first gas stream to form a spread second tow.

As a feature of the invention, the spread first tow and spread second tow are contacted together to form contacted spread tows which are passed over a grating so that the first and second tows are in contact with each other and the grating. A second gas stream, which may be a portion of the first gas stream, is passed through the grating to provide commingling of the first and second carbon filaments to form an entangled tow having an entangled tow width. The entangled tow is then formed into the combined tow.

As another feature of the invention, the first and second tows include a spreading/commingling enhancement agent that is applied to the tows prior to spreading in the spreading/commingling zone. It was discovered that use of a spreading/commingling enhancement agent allows levels of filament spreading, commingling and entanglement to be obtained that are required to form a suitable combined tow without generating excessive broken filaments or fuzz.

The present invention may be used to form combined tows where the first and second tows have an equal number of the same type of carbon filaments. As an additional feature, combined tows with a variety of properties, such as tensile modulus, tensile strength and linear weight, may be made by using first and second tows that have different filament counts and/or types of carbon filaments.

The present invention is not only directed to the method of increasing the filament count of a carbon fiber tow, but also is directed to the combined tows made in accordance with the invention including unidirectional carbon fiber tape and woven carbon fiber products. The invention is also directed to uncured composite materials made using the combined tows, such as prepreg. The invention is further directed to composite parts made from the uncured composite materials.

The above described and many other features and attendant advantages of the present invention will become better understood by reference to the following detailed description when taken in conjunction with the accompanying drawings.

BRIEF DESCRIPTION OF THE DRAWINGS

FIG. 1 is a partially diagrammatic side view of an exemplary method for increasing the filament count of a carbon fiber tow in accordance with the present invention.

FIG. 2 is a partially diagrammatic top view of the exemplary method shown in FIG. 1.

FIG. 3 is a side view of a portion of an exemplary grating showing the downward displacement of the carbon filaments due to the gas stream being passed through the grating during formation of the entangled tow.

FIGS. 4A-4E show cross-sectional representations of the starting tows and the different tow configurations at various stages during the method.

DETAILED DESCRIPTION OF THE INVENTION

Figure 5:
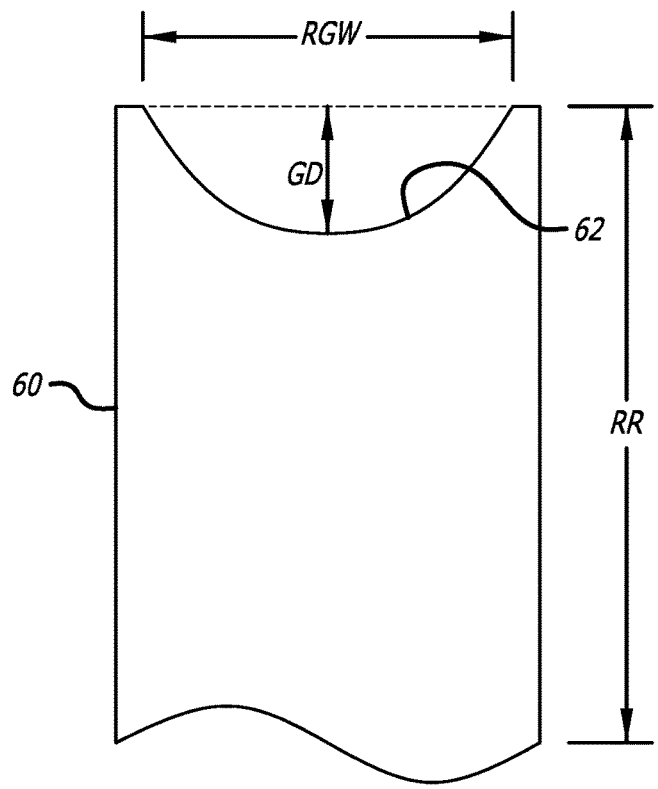
FIG. 5 is a detailed partial sectional view of a preferred exemplary consolidation reel that is used in forming an entangled tow into a combined tow.

A preferred exemplary system for carrying out the method of increasing filament count of a carbon fiber tow in accordance with the present invention is shown at 10 in FIGS. 1 and 2. A first tow 12 is fed into a spreading/commingling zone 14 (outlined in phantom) via a feed roller 16. The spreading/commingling zone 14 may be an enclosed space, such as chamber, or it may be an open space where spreading and commingling of the tows is carried out. Any type of carbon fiber tow that is composed of from 2,000 to 50,000 carbon filaments may be used as the first tow 12. Preferred carbon fiber tows are those that are commercially available and have a filament count of 3K (approximately 3000 filaments), 6K (approximately 6,000 filaments) or 12K (12000 carbon filaments).

The first tow 12 may have a variety of tensile strengths and tensile moduli. For example, the carbon fiber tow used as first tow 12 preferably has a tensile strength of from 750 to 900 ksi, a tensile modulus of from 35 to 45 Msi, a strain at failure of 1.5 to 2.5%, a density of 1.6 to 2.0 g/cm$^3$ and a linear weight of from 0.3 to 1.0 g/m (2,700 denier to 9,000 denier). The first tow 12 may alternately be a lower modulus tow which has a tensile strength of from 600 to 700 ksi, a tensile modulus of from 30 to 5.5 Msi, a strain at failure of 1.5 to 2.5%, a density of 1.6 to 2.0 g/cm$^3$ and a linear weight of from 0.3 to 1.0 g/m (2,700 denier to 9,000 denier)

A preferred carbon fiber tow for use as the first tow 12 is HexTow® 12K IM7 carbon fiber tow, which has a tensile strength of 810 ksi, a tensile modulus of 40 Msi, a strain at failure of 1.9%, a density of 1.78 g/cm$^3$ and a linear weight of 0.446 g/m (4014 denier). HexTow® IM7 carbon fiber tows and carbon fiber tows with similar properties are generally considered to be intermediate modulus carbon fiber tows. Any of the intermediate modulus carbon fiber tows having properties similar to HexTow® IM7 carbon fiber tow are preferred for use as first tow 12.

A lower modulus carbon fiber tow that is also preferred is HexTow® 12K AS4 carbon fiber tow and any other carbon fiber tow having similar properties. HexTow® AS4 carbon fiber tow has a tensile strength of 640 ksi, a tensile modulus of 33.5 Msi, a strain at failure of 1.8%, a density of 1.79 g/cm$^3$ and a linear weight of 0.858 g/m (7722 denier). Any of the lower modulus carbon fiber tows having properties similar to HexTow® AS4 carbon fiber tow are also preferred for use as first tow 12.

FIG. 4 shows simplified cross-sectional views of the tow(s) at positions (A)-(E) within the system 10, as indicated in FIGS. 1 and 2. A simplified cross-sectional view of the first tow 12 at position (A) is shown in FIG. 4. The first tow 12, at position (A), which is prior to any spreading or commingling, has a width T1 that is between 1 and 4 mm and preferably between 1.5 and 2.5 mm. Feed roller 16 includes a groove 18 that is provided to maintain the desired T1 and provide alignment of the first tow 12 with the second tow 20.

The second tow 20 may be the same carbon fiber tow as the first tow 12 or it may be a different tow having a different filament count and filaments having different properties provided that the carbon fiber tow used for the second tow 20 has properties which fall within the above outlined suitable properties for the first tow 12. The first and second fiber tows are considered to be the same for the purposes of this description if the filament count, tensile strength, tensile modulus and linear weight of the first tow are within 10 percent (preferably within 5 percent) of the filament count, tensile strength, tensile modulus and linear weight, respectively, of the second tow. The first and second fiber tows are considered to be different for the purposes of this description if the filament count, tensile strength, tensile modulus or linear weight of the first tow individually differ by more than 10 percent (preferably more than 5 percent) from the filament count, tensile strength, tensile modulus or linear weight, respectively of the second tow.

Exemplary combinations of different carbon fiber tows are: 1) the tensile modulus of the first tow is the same as the tensile modulus of the second tow and the filament count of the first tow is different from the filament count of the second tow; 2) the tensile modulus of the first tow is different from the tensile modulus of the second tow and the filament count of the first tow is the same as the filament count of the second tow; and 3) the tensile modulus of the first tow is different from the tensile modulus of the second tow and the filament count of the first tow is different from the filament count of the second tow.

Preferred exemplary combinations of first and second tows (first tow//second tow) include the following: 1) HexTow® 12K IM7 carbon fiber tow//HexTow® 12K IM7 carbon fiber tow; 2) HexTow® 6K IM7 carbon fiber tow//HexTow® 12K IM7 carbon fiber tow; 3) HexTow® 12K AS4 carbon fiber tow//HexTow® 12K AS4 carbon fiber tow; 4) HexTow® 6K AS4 carbon fiber tow//HexTow® 12K AS4 carbon fiber tow; 5) HexTow® 12K IM7 carbon fiber tow//HexTow® 12K AS4 carbon fiber tow; 6) HexTow® 12K AS4 carbon fiber tow//HexTow® 12K AS4 carbon fiber tow; 7) HexTow® 6K AS4 carbon fiber tow//HexTow® 12K IM7 carbon fiber tow; and 8) HexTow® 6K IM7 carbon fiber tow//HexTow® 12K AS4 carbon fiber tow.

The description herein is directed to HexTow® 12K IM7 carbon fiber tow and HexTow® 12K AS4 carbon fiber tow for exemplary purposes and to set forth the preferred embodiments of the invention. The invention also may also be used to increase the filament count of many other types of commercially available carbon fiber tows, such as HexTow®AS2C, HexTow®AS4C, HexTow®AS7, HexTow®IM8. HexTow®IM9, HexTow®IM5 and carbon fiber tows available from other commercial sources that have similar properties.

A simplified cross-sectional view of the second tow 20 at position (A) is also shown in FIG. 4. The second tow 20, at position (A), which is prior to any spreading or commingling, has a width T2 that is between 1 and 4 mm and preferably between 1.5 and 2.5 mm. Feed roller 22 includes a groove 24 that is provided to maintain the desired T2 and provide alignment of the second tow 20 over the first tow 12.

The first tow 12 and second tow 20 are preferably provided to their respective alignment reels 16 and 22 from standard spools of carbon fiber tow (not shown). If desired, the system 10 may be incorporated into an existing carbon fiber production line where carbon fiber tows can be fed directly to the alignment reels 16 and 22 without first being wound onto a storage spool.

The spreading/commingling zone 14 includes an inlet 26, and outlet 28, a left side 30, a right side 32, a top 34 and a bottom 36. The first tow 12 includes a plurality of first carbon filaments that extend in a first tow lengthwise direction as indicated by arrow 38. The first tow 12 has a first tow filament count, which is preferably from 3K to 24K. The second tow 20 includes a plurality of first carbon filaments that extend in a second tow lengthwise direction as indicated by arrow 40. The second tow 20 has a second tow filament count, which also is preferably from 3K to 24K.

The speed at which the first and second tows are fed through inlet 26 into the spreading/commingling zone 14 can be as low as 2 meters/minute and as high as 10 meters/minute. Tow feed speeds slower than 2 meters/minute results in disruption of the filaments and damage without any increase in cohesiveness of the combined tow. Tow feed speeds above 10 meters/minute do not allow for sufficient commingling and entanglement to provide a combined tow having the desired low spreadability. The preferred tow feed speed for 6K-12K carbon fiber tows is between 5-8 meters/minute.

At point (B) within the spreading/commingling zone 14, a first gas stream, as represented by arrows 42, is passed transversely through the first tow 12 and second tow 20 to provide lateral spreading of the tows. The first gas stream is preferably a stream of air. Other gases may be used provided they do not adversely affect the tows. For example, a gas stream composed substantially of nitrogen may be used in situations where an inert environment is desired.

The velocity of the first gas stream 42 and the lengthwise tensions applied to the first tow 12 and second tow 22 at point (B) are selected to provide gas-induced or pneumatic spreading of the tows. The downward velocity of the first gas stream 42 should be from 10 to 25 meters/second and preferably from 15 to 20 meters/second. The lengthwise tension on the first tow 12 should be from 50 to 150 grams. The lengthwise tension on the second tow 20 should also be from 50 to 150 grams. For 6K and 12K carbon fiber tows, the preferred tension at point (B) is from 90 to 110 grams.

At point (B), the second tow 20 remains aligned directly above the first tow 12 as both tows are pneumatically spread to form a spread first tow 44 and spread second tow 46. The spread first tow 44 has a spread first tow width (ST1) and the spread second tow has a spread second tow width (ST2). The tows do not contact each other during the spreading operation. It was found that contact between the tows prior to completion of the spreading step had a negative effect on the subsequent commingling of the tows.

The tow feed speed, first gas stream velocity and tow tensions are chosen to provide a degree of spreading for the first tow and second tow that is necessary to form a cohesive combined tow. The first tow 12 should be spread so that the ratio between ST1 and T1 is from 5:1 to 25:1. An ST1 to T1 ratio of from 8:1 to 12:1 is preferred for 6K and 12K carbon fiber tows. The second tow 20 should be spread so that the ratio between ST2 and T2 is from 15:1 to 40:1. An ST2 to T2 ratio of from 20:1 to 30:1 is preferred.

When the first and second tows are the same carbon fiber tow, the second tow 20 tends to be spread more than the first tow 12 due to the second tow being located directly above the first tow 12 in the first gas stream 42. It was found that initially wider tows tend to spread more in the first gas stream than narrower tows. It was also found that tows, having larger diameter filaments tend to spread more in the first gas stream.

The orientation of the tows in the first gas stream, as well as the width of the tows and filament size, are chosen so that the ratio between ST2/T2 and ST1/T1 is from 1.5:1 to 5:1. It is preferred that the ratio between ST2/T2 and ST1/T1 be from 2:1 to 3:1. When the first tow and second tow are both either 6K or 12K carbon fiber tows, the preferred ratio between ST2/T2 and ST1/T1 is 2.5:1. The tension placed on the tows affects the gas-induced spreading. It is preferred that the tension applied to the first tow 12 is equal to the tension applied to the second tow 20 (±10%). However, the tension applied to the first and second tows may be varied together or independently to achieve desired levels of ST1/T1 and ST2/T2 that are require to provide desired ratios of ST1/T1 to ST2/T2.

The spread first tow 44 and spread second tow 46 are contacted with each other and a grating 50 at point (C) to form contacted spread tows 48. The contacted spread tows 48 have a width (CST). As the contacted spread tows 48 move across the grating 50 they are exposed to a second gas stream represented by arrows 52 which passes through the grating 50. The second gas stream 52 preferably has the same source as the first gas stream 42, so that the second gas stream is a portion or part of the first gas stream. Accordingly, the above described parameters for the first gas stream 42 are also applicable to the second gas stream 52. It is preferred that the first and second gas streams are the same to provide a single gas stream that spreads and commingles the first and second tow at the same gas stream velocity. However, there may be situations where it is desired to use a first gas stream to spread the first and second tows and then use a different second gas stream to commingle the tows.

At point (C), the spread first and second tows are in contact with each other and the grating 50. The second gas stream 52, in combination with movement of the tows over the grating 50, causes formation of an entangled tow 56 which has a width (ET). The width of the entangled tow 56 as it crosses grating 50 is preferably kept relatively close to the width of the contacted spread tows 48 so that the ratio between CST and ET remains at from 0.9:1 to 1.1:1. The tension applied to the entangled tow 56 on grating 50 and the velocity of the second gas stream 52 are selected to keep CST/ET in the desired range.

A partial sectional view of a preferred exemplary grating 50 is shown in FIG. 3. The grating 50 includes bars in the shape of rods 54 which are spaced apart a distance (GS). The number of bars in the grating, cross-sectional shape, dimensions and spacing may be varied to achieve desired levels of commingling. The downward force applied to entangled tow 56 by the gas stream causes a downward displacement "D" of the entangled tows between the bars. The tension on the entangled tow 56, the velocity of the second gas stream 52 and GS are selected to achieve a "D" that provides sufficient commingling without causing excessive breakage of filaments. If the tension is too low, the tows are drawn too far into the grating and damaged. If the tension is too high, desired levels of spreading and commingling do not occur.

The grating 50 should have from 10 to 20 grating rods 54 that extend parallel to each other between the left edge 30 and right edge 32 of the spreading/comingling zone 14. The rods 54 should have a diameter of 2 to 5 mm and GS should range from 3 mm to 9 mm. D should be from 0.5 mm to 5 mm in order to achieve sufficient commingling of the filaments without increasing fizz count. A preferred grating for commingling 6K and 12K carbon fiber first tows and second tows will have from 12 to 16 rods which each having a diameter of 2 to 3 mm and a GS of 4 to 6 mm. When this preferred grating is used to commingle 6K and/or 12K carbon fiber tows, tow tension and the velocity of the second gas stream 52 are selected so that D is from 1 mm to 3 mm.

The grating bars 54 are shown as rods having a circular cross-section. Other types of grating bars are possible, such as those having non-cylindrical arcuate cross-sectional shapes or square/rectangular cross-sections. When grating bars with non-cylindrical cross-sectional shapes are used, care must be taken to control the other process parameters to ensure that adequate commingling is obtained without causing excessive filament breakage.

The entangled tow 56 is removed from the commingling/spreading zone 14 through outlet 28. The entangled tow 56 is formed into a combined tow 58 by passing the entangled tow 56 over a consolidation reel 60 that has a grooved perimeter 62 which is designed to reduce the width of the entangled tow 56 to the width (CT) of the combined tow 58. The grooved perimeter 62 has a concave shape which is designed to provide the desired reduction from ET to CT without adversely affecting the commingled filaments.

A detailed partial sectional view of the exemplary consolidation reel 60 is shown in FIG. 5. The consolidation reel 60 is designed for use in forming 6K to 24K entangled tows 56 into combined tows 58. The consolidation reel 60 has a radius (RR) of from 30 to 60 mm with the groove 62 having a width (RGW) of from 10 to 25 mm and a depth (GD) of from 4 to 10 mm.

The tension applied to the entangled tow 56 as it is passed to the consolidation reel 60 is maintained at a level which, in combination with the groove 62, provides the desired reduction in tow width. The width of the combined tow (CT) should be from 2 to 5 mm for combined tows containing from 6K to 24K carbon filaments. Tension on the entangled tow 56 between point (D) and the consolidation reel 60 should be between 300 to 500 grams.

It was discovered that an organic oil-based surfactant, which is applied to the first and/or second tows prior to point (B), acted as a spreading/commingling enhancement (SCE) agent to provide desired levels of spreading and commingling of the tows without damaging them. When subjected to the same degree of spreading and commingling, the fuzz count of the combined tow tended to be substantially higher when the SCE was not used.

The SCE agent can be any of the organic-oil based surfactants that are commonly used as softening agents in the textile industry. Exemplar SCE agents include alkoxylated castor oil triglycerides, such as ethoxylated castor oil triglycerides. Preferred exemplary SCE agents are polyoxyethylene castor oil solutions which are available from Henkel Corporation (Dusseldorf, Germany) under the trade name TRYLOX. For example, spreading and commingling of a 12K IM7 first tow and 12K IM7 second tow was qualitatively improved when the tows were initially treated by being passed through a solution of TRYLOX 5918 (1% solution) followed by drying at 135° C.

The SCE agent can be applied to the first tow and/or second tow any time prior to point (C). For example, the tows may be passed through a bath of SCE agent and dried in-line between points (A) and (B). Alternately, the SCE agent may be applied to the tows at any time prior to their being passed over alignment reels 16 and 22.

Any of the sizing agents that are conventionally applied to carbon fiber tows may also be applied to the combined tow 58. Such conventional sizing agents include vinyl ester sizing agents, epoxy-based sizing agents, phenolic sizing agents, polyurethane sizing agents and the like. When a sizing agent is desired, it should be applied only after spreading and commingling of the first and second tows. Application of the above types of conventional sizing agents to the tows at any point in the system prior to point (D) was found to adversely affect the spreading and commingling of the tows. It is preferred that the sizing, if any, is applied at a point after the entangled tow 56 exits the spreading/commingling zone 14.

The combined tow 58, with or without sizing, is wound onto a take up spool 64 for storage and further use. The combined tow 58 may be used in the same manner as any other carbon fiber tow to make a wide variety of composite materials. For example, combined tow 58 may be formed into unidirectional tape or woven fabric, and combined with an uncured thermoplastic or thermosetting resin matrix to form a wide variety of prepreg and molding compounds that may be cured/molded to form composite parts.

A preferred example of practice in which the filament count of a carbon fiber tow is increased using the same type of carbon filaments is as follows: a combined tow 58 was made using system 10 in which the first tow 12 was HexTow® 12K IM7 carbon fiber tow and the second tow 20 was HexTow® 12K IM7 carbon fiber tow. T1 and T2 were both 2 mm and the line speed through inlet 26 was 3 meters/minute with the tension on the first and second tows being 100 grams each. Both the first tow and second tow were passed at the line speed through a 1% solution of TRYLOX 5918 and dried at 135° C. prior to being spread and commingled in the spreading/commingling zone 14. The velocity of the first and second air streams 42 and 52 was the same at 20 meters/second. The ratio of ST1 to T1 was 10:1 and the ratio of ST2 to T2 was 25:1. The grating 50 contained 14 grating bars 54. The diameter of each grating bar 54 was 2.3 mm and GS was 4.7 mm. Tension on the entangled tow 56 was 400 grams and the width (CT) of the combined tow 58 was 3 mm. It should be noted that the preceding method parameters are approximate values and ma each be varied ±15% without adversely affecting the formation of a combined tow 58 which has the desired spreadability and fuzz count.

The spreadability of the combined tow 58 (24K filaments), made as described above, was measured using tow evaluation equipment similar to the ROVINGTEST tow evaluation equipment. The spreadability of the combined tow 58 was 1.7 (±10%). The spreadability of standard HexTow® 24K IM7 carbon fiber tow was also measured on the same tow evaluation equipment. The spreadability of the standard HexTow® 12K IM7 carbon fiber tow was 2.0 (±10%).

The above example demonstrates that combined tows made in accordance with the present invention are sufficiently cohesive that they have a spreadability which is equal to or less than the spreadability of the standard commercially available tow having the same filament count. It is preferred that the spreadability of the combined tow is equal to or less than the spreadability of a standard commercial tow having the same filament count when measured using the same testing equipment. However, the method and system of the present invention is also useful in making combined tows generally where the spreadability of the combined tow, when measured on the same test equipment, is within 25% of the spreadability of a similar commercially available tow having the same filament count.

Fuzz counts of the combined tow (24K filaments) and standard HexTow® 12K IM7 carbon fiber tow were determined using test equipment similar to the FRAY VIEW yarn defects visualization device. The fuzz counts of the combined tows were less than 25% above the fuzz counts for the standard HexTow® 12K IM7 carbon fiber tow.

A preferred example of practice for making a hybrid combined tow where the filament count of a carbon fiber tow is increased using different carbon filaments is as follows: a combined tow 58 was made using system 10 in which the first tow 12 was HexTow® 12K IM7 carbon fiber tow and the second tow 20 was HexTow® 12K AS4 carbon fiber tow. T1 was 2 mm and T2 was 2.5-3 mm. The system and method parameters were otherwise the same as set forth in the above preferred example. The ratio of ST1 to T1 was 10:1 and the ratio of ST2 to T2 is 30:1. CT was 4 mm. These are also approximate values which, like the parameters mentioned above, may be varied by ±15%.

Spreadability and fuzz counts can be measured for the hybrid combined tow and commercially available HexTow® 12K AS4 carbon fiber tow in the same manner as described above for the 12K IM7//12K IM7 combined tow and commercially available HexTow® 12K IM7 carbon fiber tow. The spreadability of the hybrid combined tow will be 2.0 (±10%) and the spreadability of the HexTow® 12K AS4 carbon fiber tow will be 2.0 (±10%). This example demonstrates that 12K IM7//12K AS4 hybrid combined tows can be made in accordance with the present invention that have spreadability (cohesiveness) that compares favorably to the spreadability of both HexTow® 12K IM7 and HexTow® 12K AS4.

The fuzz counts of the hybrid combined tow and HexTow® 12K AS4 can also be measured as in the preceding example. The fuzz count of the hybrid combined tow is expected to be less than 25% above the fuzz counts for either commercially available HexTow® 12K IM7 or HexTow® 12K AS4.

Figure 6:
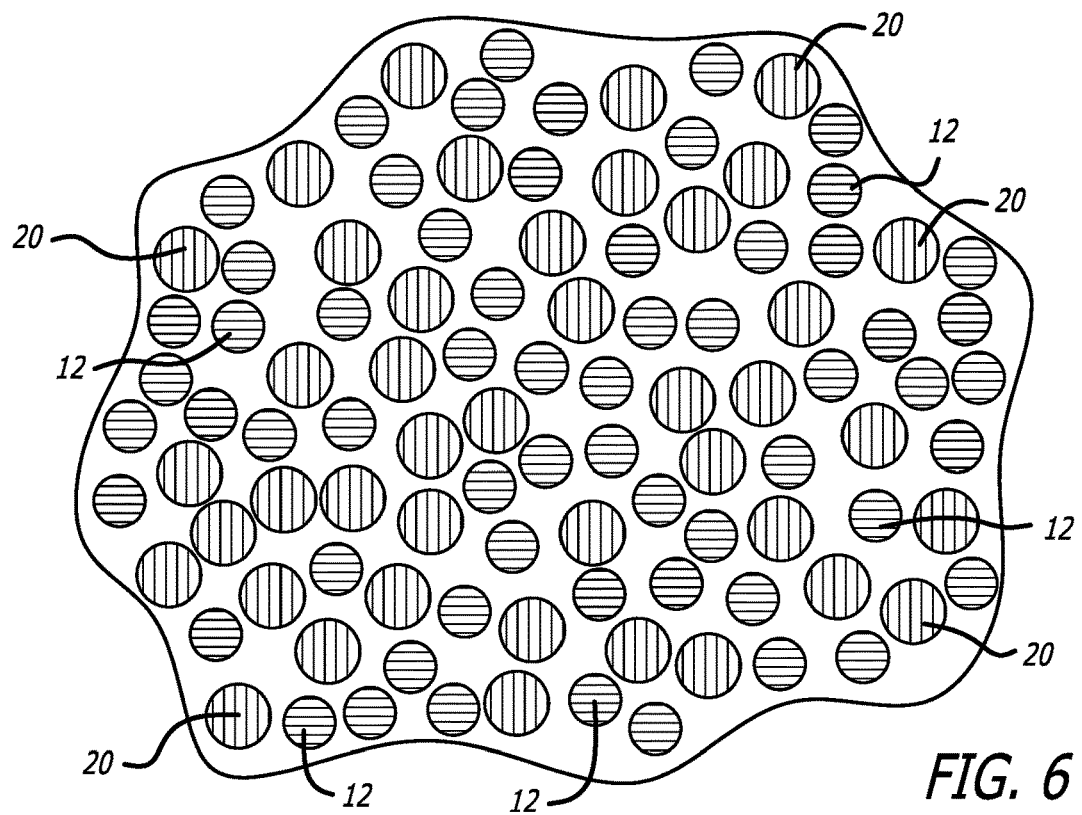
FIG. 6 is a representational sectional view of a portion of an exemplary hybrid combined tow which includes a first tow that has carbon fiber filaments which are different from the carbon fiber filaments in the second tow.

The filaments of HexTow® 12K IM7 carbon fiber tow have a diameter that is less than the filament diameter of HexTow® 12K AS4 carbon fiber tow. A cross-section of the hybrid combined tow was viewed microscopically to determine the homogeneity of filament commingling based on the different filament diameters. It was found that the hybrid combined fiber had a substantially homogenous cross-sectional mixture of IM7 and AS4 filaments. Such a homogenous commingling of the filaments is a particular advantage in accordance with the present invention when carbon fiber tows having different properties are combined. A representational sectional view of the hybrid combined tow is shown in FIG. 6 where the IM7 filaments (5.2 micron diameter) are shown as 12 and the AS4 filaments (7.1 micron diameter) are shown as 20.

It should be noted that the invention is not limited to combining a first tow with a second tow, but can also be used to increase filament count by aligning, spreading and commingling 3 or more tows. When combining more than two tows, the various conditions and parameters set forth above with respect to combining a first tow with a second tow may be varied in order to achieve desired levels of commingling of the multiple tows and spreadability of the combined tow.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for increasing the filament count of a carbon fiber tow by forming a combined tow, said method comprising the steps of:

provide a first tow which comprises a plurality of first carbon filaments that extend in a first tow lengthwise direction, said first tow having a first tow filament count and a first tow width;

providing a second tow which comprises a plurality of second carbon filaments that extend in a second tow lengthwise direction, said second tow having a second tow filament count and a second tow width;

passing said first tow into a tow spreading/commingling zone in said first tow lengthwise direction, said tow spreading/comingling zone having an inlet, an outlet, a left side, a right side, a top and a bottom, wherein said first tow is passed through said inlet at a feed speed;

passing said second tow into said tow spreading/commingling zone in said second tow lengthwise direction wherein said second tow is passed through said inlet at said feed speed, said second tow being aligned above said first tow wherein said second tow does not contact said first tow;

providing a grating located at the bottom of the spreading/comingling zone, said grating comprising a plurality of bars that extend parallel to each other between the left side and right side of said spreading/commingling zone;

providing a first gas stream flowing in a direction from the top of said spreading/commingling zone to said bottom;

contacting said first tow with said first gas stream in order to spread said first carbon filaments apart a sufficient distance to provide a spread first tow that has a spread first tow width, wherein the ratio of said spread first tow width to said first tow width is from 5:1 to 25:1;

contacting said second tow with said first gas stream in order to spread said second carbon filaments apart a sufficient distance to provide a spread second tow that has a spread second tow width, wherein the ratio of said spread second tow width to said second tow width is from 15:1 to 40:1 and wherein the spread second tow width is greater than the first spread tow width;

contacting said spread first tow with said spread second tow to form contacted spread tows;

providing a second gas stream flowing in a direction from the top of said spreading/commingling zone to said bottom wherein said second gas stream flows through said grating;

passing said contacted spread tows over said grating in the presence of said second gas stream to provide commingling of said first filaments with said second filaments to form an entangled tow which has an entangled tow width; and forming said entangled tow into a combined tow that has a combined tow width and combined filament count, wherein the ratio of said entangled tow width to said combined tow width is from 5:1 to 40:1 and wherein the combined filament count is greater than said first tow filament count or said second tow filament count.

2. The method for increasing the filament count of a carbon fiber tow according to claim 1 wherein said first tow and/or said second tow comprise a spreading/commingling enhancement agent.

3. The method for increasing the filament count of a carbon fiber tow according to claim 1 wherein said first tow and said second tow have the same tensile modulus and the same filament count.

4. The method for increasing the filament count of a carbon fiber tow according to claim 1 wherein the tensile modulus of said first tow is the same as the tensile modulus of the second tow and wherein the filament count of said first tow is different from the filament count of said second tow.

5. The method for increasing the filament count of a carbon fiber tow according to claim 1 wherein the tensile modulus of said first tow is different from the tensile modulus of the second tow and wherein the filament count of said first tow is the same as the filament count of said second tow.

6. The method for increasing the filament count of a carbon fiber tow according to claim 1 wherein the tensile modulus of said first tow is different from the tensile modulus of the second tow and wherein the filament count of said first tow is different from the filament count of said second tow.

7. The method for increasing the filament count of a carbon fiber tow according to claim 1 wherein the second carbon filaments have a linear weight that is greater than the linear weight of said first carbon filaments.

8. The method for increasing the filament count of a carbon fiber tow according to claim 1 wherein said second spread tow has a width of from 4 to 6 centimeters.

9. The method for increasing the filament count of a carbon fiber tow according to claim 1 wherein said first spread tow is under a lengthwise tension of from 50 to 150 grams and said second spread tow is under a lengthwise tension of from 50 to 150 grams.

10. The method for increasing the filament count of a carbon fiber tow according to claim 1 wherein the velocity of said first gas stream is the same as the velocity of said second gas stream.

11. The method for increasing the filament count of a carbon fiber tow according to claim 1 which includes the additional step of applying a sizing agent to said entangled tow or said combined tow to form a sized combined tow.

12. The method for increasing the filament count of a carbon fiber tow according to claim 2 which includes the additional step of applying a sizing agent to said entangled tow or said combined tow to form a sized combined tow.

13. The method for increasing the filament count of a carbon fiber tow according to claim 1 which includes the additional step of combining said combined tow with an uncured resin matrix.

14. The method for increasing the filament count of a carbon fiber tow according to claim 13 which includes the additional step of curing said uncured resin matrix.

\* \* \* \* \*